United States Patent Office 3,138,846
Patented June 30, 1964

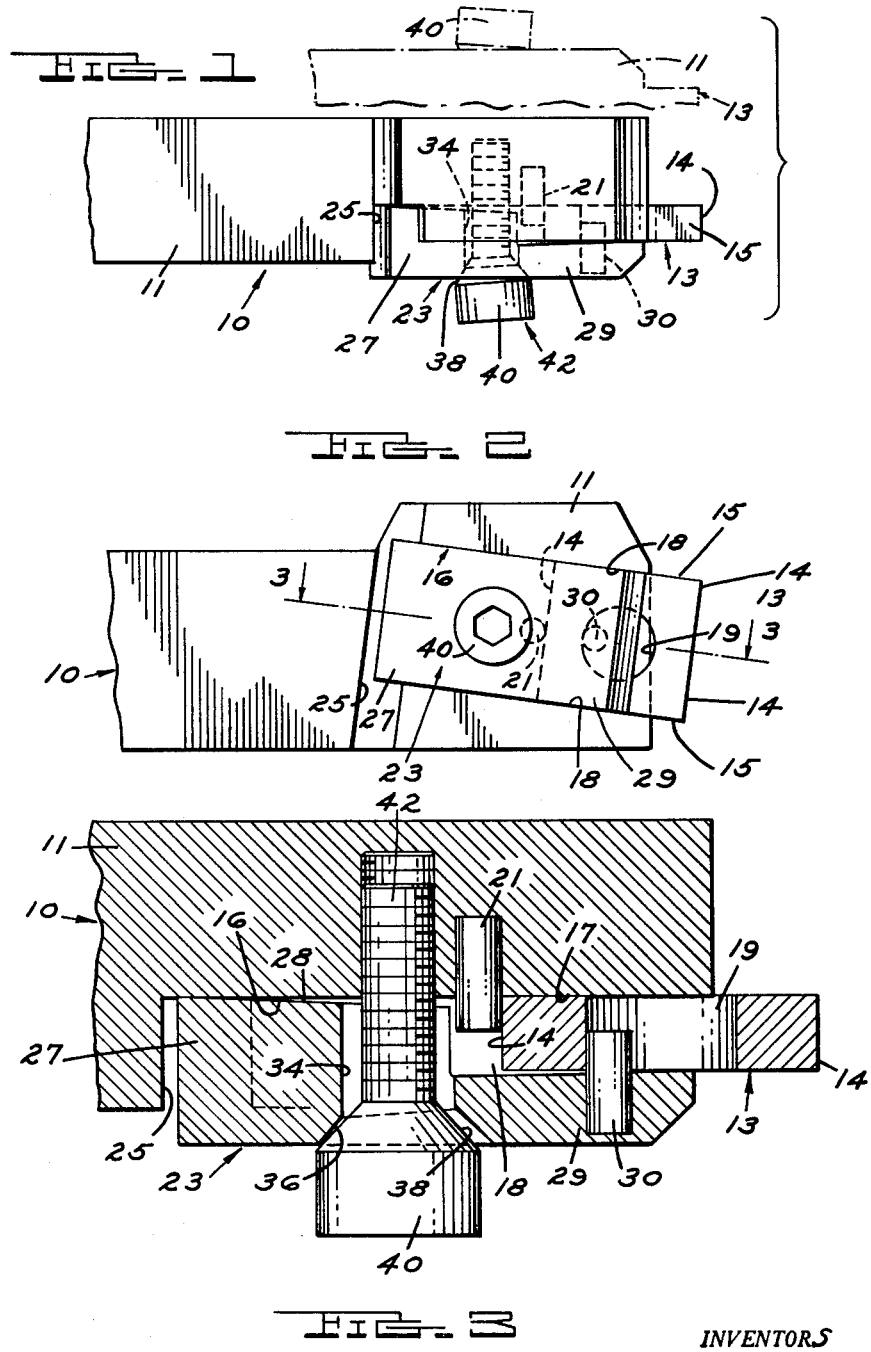

3,138,846
GROOVING TOOL
Alfred R. Conti, Walled Lake, and Donald W. McLennan, Farmington, Mich., assignors to Posa-Cut Corporation, Farmington, Mich., a corporation of Michigan
Filed Nov. 13, 1961, Ser. No. 151,949
2 Claims. (Cl. 29—96)

The present invention relates to an improved tool for grooving work pieces in machine tool operations involving a straight radial in-feed of the tool relative to the work, as distinguished from axial feed type lathe or boring operations. Nevertheless, the present grooving tool involves certain features of improvement shown in the copending application, Serial No. 23,514 of Conti and Menter filed April 20, 1960, and Conti and Menter Patent No. 2,999,301, dated September 12, 1961, both relating to axial feed cutters.

It is a general object of the present invention to provide an improved grooving tool embodying in a very simple and relatively inexpensive construction, a body, base or shank member adapted to be fixedly mounted in the usual tool holder unit of the machine, and a cutting bit or insert of the replaceable or "throw-away" tungsten-carbide type, specifically of rectangular outline similar to that illustrated in the copending application and patent referred to above (but employed in quite a different relation to the holder body); together with improvements in the way of automatically actuable means for guiding and drawing such insert into locked position on the tool body and for anchoring the same well inwardly in position to withstand thrust arising in the operation of such grooving tool.

More specifically, it is an object of the invention to provide a tool having a rectangular (preferably square) indexable and throw-away type insert which in the mounting thereof to the holder is guided with a close side tolerance in an elongated, upright parallel sided way in the tool holder body or shank, finally abutting a horizontal pin type of stop at the rear of the way, against which pin the insert has a rigid located and locked final engagement.

The insert preferably features a relatively enlarged through-recess centrally of its rectangular body portion; and the insert is drawn to the rear by an actuator pin acting at this recess, being accurately guided for movement in the direction of its opposed parallel, top and bottom sides into an operative clamped position between the body part of the tool holder and a clamping element movable thereon, which element drives the actuator pin referred to.

More specifically, the fixed stop or abutment pin is centered rearwardly on the tool holder body relative to the guide way of the latter so as to be in the path of the insert's retractile motion towards clamping position. Such fixed stop will also be in approximate alignment with the actuator pin on the movable clamp.

These two pin members are not necessarily, and cannot practically be and remain, aligned longitudinally with great accuracy relative to one another. Being relatively movable, there is inevitably an extremely slight final cant or angular misalignment in the guide way, even assuming a close sliding tolerance side fit of the insert; and the result is that the actuator pin of the clamp draws the insert strongly to the rear against the fixed pin of the tool body. As this happens the insert will be laterally cocked the slightest fraction of an inch, or fractional minute of arc, into tight engagement of its opposed top and bottom surfaces with the respective opposed parallel and approximately horizontal walls of the tool body's way, the pressure engagements being at points forwardly and rearwardly of the insert.

Thus there results a tool in which, without the necessity of accurate machining operations, other than necessary to produce a reasonably close sliding fit of the cutting bit or insert in the tool holder way referred to above, a machinist is enabled to quickly and easily place initially or re-index a "throw-away" type of cutter on the tool holder, and then put it back in work with a minimum lost time.

The insert is, in effect, tightly chucked at multiple points of maximum pressure engagement, i.e., at the point of the holder body's fixed abutment pin, at a bottom point adjacent the front of the insert and at a top point adjacent its rear, being also held in this position by the side clamping force of the clamp element which carries the actuator pin. This constitutes still another point at which chucking action is exerted on the insert at its recess.

A general object of the invention is also to provide a grooving tool having the foregoing characteristics, as embodied in a holder carrying a single grooving cutter or insert, yet which is also ideally suited, using a suitably proportioned holder body, to mount dual, laterally spaced grooving inserts on a single holder. For this purpose, the relatively simple insert way, stop, clamp and actuator provisions of the single tool form are simply duplicated upon opposite vertical sides of the holder body.

The foregoing as well as other objects will become more apparent as this description proceeds, especially when considered in connection with the accompanying drawing illustrating the invention, wherein:

FIGS. 1 and 2 are, respectively, top plan and side elevational views of the improved grooving tool, FIG. 1 suggesting, in dot-dash line, the manner in which the invention may be embodied in a duel insert type of grooving tool; and FIG. 3 is a fragmentary enlarged scale view in cross section along line 3—3 of FIG. 2.

The tool holder proper, generally designated by the reference numeral 10, comprises a body or shank portion 11 serving as a cutter mount, which is fixedly clamped in the usual holder unit (not shown) of the machine. The mounting is such as to present the cutter on the holder body 11 to the work for a radially inward, non-axial feed motion relative to the revolving work piece.

The holder body 11 has provisions to removably support thereon a replaceable or throw-away type carbide grooving insert 13 of square outline presenting perimetral surfaces 14 which intersect the flat parallel sides of the insert to define linear grooving edges 15 at the corners. Insert 13 is received in an upright groove or way 16 formed in and opening forwardly of the body 11, the upright side 17 of such way being a flat, accurately formed supporting surface against which a flat side surface of the cutting insert 13 accurately engages throughout a considerable part of its area. The way 16 is completed by opposed parallel, top and bottom walls 18, between which opposed side surfaces 14 of insert 13 are received with a close sliding tolerance fit, amounting to an overall upright clearance of, say, 0.001 inch–0.003 inch.

The cutting insert 13 is, as indicated above, of the sort illustrated in my copending application referred to, featuring a relatively large cylindrical center aperture 19 therethrough, the wall of which presents a clamping surface for the purposes of the invention.

The body 11 is provided, in a portion thereof towards the rear of the way 16, with a fixed horizontal stop or abutment pin 21. This is centered transversely mid-wise of the way 16 (FIG. 2) and is adapted to be rigidly engaged by the rear upright marginal surface 14 of the insert 13, as the latter is drawn into locating and clamping position in the way 16 in the manner to be described.

For the last named purpose, a side clamping member, generally designated 23, is received in the way 16 for lateral clamping action against the insert 13, after first bringing the latter rearwardly into rigidly engaged relation to the abutment pin 21. It will be noted that the upright rear wall 25 of the way in body 11 is spaced somewhat to the rear of clamp 23 to accommodate a slight rearward motion of member 23 in this action.

Clamp 23 is of elongated rectangular outline, featuring a rear, block-like portion 27 which is adapted to be slidingly received within the walls 18 of way 16, rearwardly of stop pin 21. It also has sliding engagement in the zone of its rear with the side surface 17 of the way. As initially disposed, the lower surface 28 of the portion 27 inclines slightly forwardly and outwardly of surface 17, with clamping member 23 thus being in a position to be sprung laterally toward that surface for the application of final clamping force to insert 13.

At its forward end portion 29, which is spaced outwardly or offset from the surface a distance approximating the thickness of insert 13, the clamp 23 carries a laterally projecting actuator pin 30 in fixed relation thereto, which pin engages within the cylindrical recess 19 of insert 13, acting against the rear wall thereof as illustrated in FIG. 1. Hence a very slight motion of the clamp member 23 to the left in way 16 (by means to be described) will bring the rear rectilinear surface 14 of the insert into tight-engagement with the stop or abutment pin 21, centrally of said surface. At the same time the action tends to cant the insert ever so slightly in its vertical plane, stressing engagement against the opposed way walls 18 at forward and rearward zones of the insert.

Following these engagements, a lateral inward motion of the forward part 29 of clamp 23 attending inward flexure of the latter will tightly clamp the insert 13 in place. It will be observed from FIG. 2 of the drawings, that there is a considerable area of the forward portion 29 of the clamp laterally overlying the insert 13 for this purpose.

Clamping member 23 is provided with a cylindrical recess 34 extending therethrough to the rear of portion 14, the recess being forwardly exposed beneath portion 14. Conical cam seat 36 is formed at the outer margin of recess 34 on an axis inclined a few degrees forwardly of that of recess 34 and a perpendicular to the way surface 17; and seat 36 is adapted to be cammingly engaged by a conical surface 38 of the Allen head 40 of a screw 42 extending downwardly through the recess 34 of clamp 23 and threaded into the base portion 11 of the tool body at 90° to the way surface 17. Thus the screw cone 38 and the recess cone 36 are disposed, as suggested in my patent identified above, at an angle between their axes of about four degrees.

Thus, upon the rotation of screw 42 to cammingly engage screw cone 38 with the rear of the conical clamp cam surface 36, the clamp 23 and its actuator pin 30 will be drawn to the rear or to the left. The pin 30 urges the insert 13 against fixed body abutment pin 21, following which the lateral compression of the clamp 23 as rearward motion halts will flex it and tightly engage its forward portion 32 against the insert to clamp the same rigidly in the located position.

While the relatively fixed and movable pins 21, 30 are illustrated in FIG. 2 of the drawing as being in substantial front-to-rear alignment with one another, it is usually the case that there will be a slight minimal or fractional variation from exact true alignment, and in any event the sliding tolerance between insert 13 and the way walls 18 permits a bit of insert cant in the vertical plane. Hence the strong rearward drawing of the insert into place cocks it under magnified force at forward and rearward zones of its respective opposed surfaces 14 against the opposed walls 18; and it is thus held when screw 42 is fully taken up. This results in an extremely strong securement of the insert in place under chucking action at the opposed pins 21, 30, at the way walls 18, and laterally at the forward portion 29 of clamp 23 overlapping the insert.

As indicated above, and as suggested in dot-dash line in FIG. 1, the provisions of the invention are, by simple duplication thereof on opposite sides of the holder body, such as to enable the tool to be produced for the mounting of dual, transversely spaced grooving inserts, both mounted upon a single holder body.

What we claim as our invention is:

1. A grooving tool comprising a holder base providing a flat upright supporting surface at a forward insert-mounting portion thereof, said base being provided with flat parallel, top and bottom walls of substantial front-to-rear length on either side of said supporting surface and coacting therewith in providing a way for the reception of a cutting insert, a fixed abutment pin on said base projecting laterally of said surface at a point toward the rear thereof and substantially centrally between said walls, a flat cutting insert having opposed pairs of parallel side surfaces spaced from one another for a sliding fit with close overall clearance of said opposed side surfaces between said walls, a portion of said insert between said side surface having local rearwardly abutting engagement with said abutment pin in an operative position with said insert projecting forwardly of said base and way, and manually operable means to clamp said insert against said supporting surface, said clamping means including a clamp member in clamping engagement with said insert, said member being provided with an actuator pin engaging said insert to draw the latter to the rear upon operation of the clamping means, and means threadedly engaged with said base and having camming engagement with said clamp member to so draw said actuator pin and to clamp said insert against said supporting surface of said base, said abutment and actuator pins being spaced in the front-to-rear direction from one another and being in approximate alignment with one another in that direction on a line generally paralleling said insert side surfaces and said base walls to occasion said local engagement of said insert with said abutment pin.

2. A grooving tool in accordance with claim 1, in which said overall clearance of said opposed side surfaces between said walls is about 0.001 inch–0.003 inch.

References Cited in the file of this patent

UNITED STATES PATENTS

| 1,396,180 | Fors | Nov. 8, 1921 |
| 1,737,990 | Benson | Jan. 18, 1926 |
| 2,838,827 | Wright | June 17, 1958 |
| 2,999,301 | Conti | Sept. 12, 1961 |

FOREIGN PATENTS

| 1,204,054 | France | Aug. 3, 1959 |